METHOD AND APPARATUS FOR RECORDING COMPOSITE DIFFRACTION GRATING PATTERN
Filed May 18, 1966
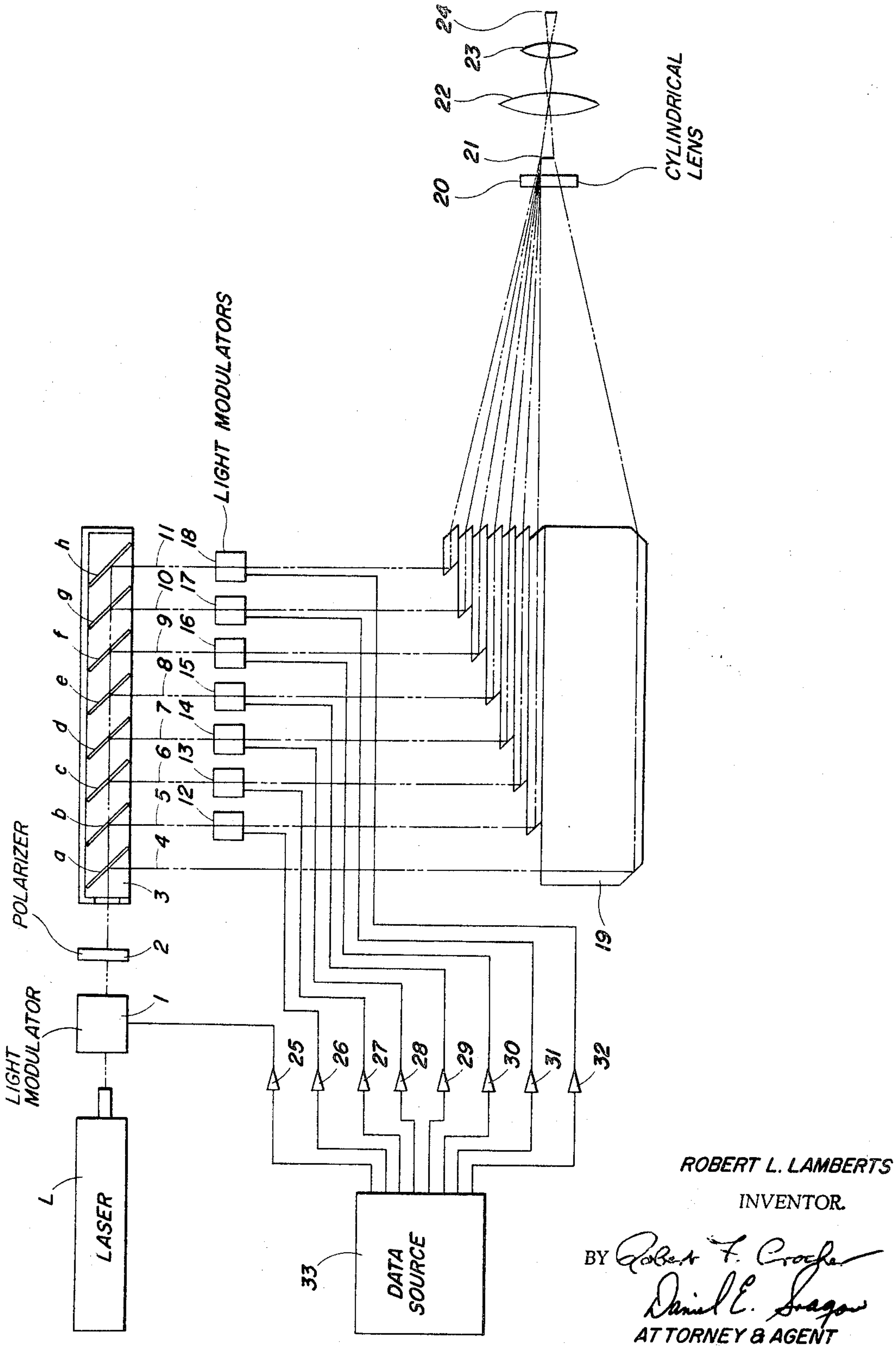
ROBERT L. LAMBERTS
INVENTOR.
BY Robert F. Crocker
Daniel E. Sragow
ATTORNEY & AGENT 3,408,656

METHOD AND APPARATUS FOR RECORDING COMPOSITE DIFFRACTION GRATING PATTERN

Robert L. Lamberts, Rochester, N.Y., assignor to Eastman Kodak Company, Rochester, N.Y., a corporation of New Jersey Filed May 18, 1966, Ser. No. 551,056
6 Claims. (Cl. 346—1)

ABSTRACT OF THE DISCLOSURE

Apparatus for recording digital data in the form of a plurality of superimposed but distinct single frequency diffraction gratings, the gratings being formed by interference patterns created between reference and "digit" beams derived from a laser source. Beam splitters and electro-optical light modulating devices are used to control selectively the "digit" beams.

This invention relates to information storage and retrieval systems, and particularly to a method of digital data recording in which superimposed grating patterns are exposed onto a photographic film.

With digital computers getting larger and demanding greater information storage capacity, there has arisen a need for an information storage medium which takes a minimum amount of space. A conventional method of storing binary digital information has been on punched cards. Each presence or absence of a hole in the card is indicative of a binary bit. When it is attempted to place more holes in a punched card in order to store more information, the card becomes very fragile and even so does not have the desired large capacity.

Digital information has also been stored on photographic film with dark spots being indicative of binary bits. This has allowed greater storage capacity than punched cards because of the great resolving power of photographic film but has several disadvantages. First, as the dots on the film are made smaller in order to increase the information storage per unit area on the film, the accuracy with which the film has to be positioned increases. Furthermore, as the dots are made smaller, the read out device has increasing difficulty in distinguishing between a dot and a speck of dirt, and between a scratch and a blank space. Another prior art system of storing digital information on photographic film uses diffraction gratings instead of dots and blanks. In this system a diffraction grating of one frequency is used to represent a binary 1, and a diffraction grating of another frequency is used to represent a binary 0. The diffraction gratings are recorded on film. When it is desired to read out the recorded information, monochromatic light is directed through the recorded gratings, and the first order images from the gratings are detected to determine which bit has been recorded. This sytsem helps to reduce the problem of distinguishing between scratches and dust, and information, but it does not increase the information capacity of the film, since the film area required to record each bit is substantially the same as before, and extremely accurate record positioning is still required.

In U.S. Patent 3,312,955 issued Apr. 4, 1967, to R. L. Lamberts and G. C. Higgins, there is disclosed a method and apparatus for recording binary information on film as superimposed diffraction gratings, each grating corresponding to a binary bit. This type of record has the additional advantage of being able to more fully utilize the resolving power of the film, i.e., it permits more information to be stored per unit area. This is brought about because in the same area of the film previously used for one binary bit there are now recorded several binary bits.

There is no need for increased accuracy of the positioning mechanism, since the total information in the superimposed gratings is spread throughout the whole space occupied by the gratings.

It is an object of this invention to provide new methods and apparatus for recording superimposed diffraction gratings. This object is realized by providing a source of coherent radiation which has been formed into a beam, splitting the beam into a plurality of individual beams having differing paths, directing said individual beams to a common position so that the individual beams intersect in a common area to form an interference pattern, and recording the interference pattern so as to produce a composite diffraction grating.

Other objects of the invention will appear from the following description, reference being made to the accompanying drawing wherein:

The sole figure schematically shows an apparatus for producing an interference pattern according to the invention.

More specifically a source of radiant energy, laser L, produces a coherent polarized beam which passes through light modulator 1 and polarizer 2 to a beam splitter 3. The light modulator 1 may be any one of several well known devices which selectively rotate the polarization of a beam, such as a Kerr cell, a Faraday cell or a Pockels cell. When the beam from light modulator 1 is polarized in a plane 90° from the plane of polarization of polarizer 2, no light will pass to the beam splitter 3. In this way, the light reaching the beam splitter 3 can be turned on or off at will, merely by energizing light modulator 1 so that it rotates the polarization of the beam by 90°. Of course where speed of operation is not important light modulator 1 and polarizer 2 could be replaced by a shutter.

Beam splitter 3 has several serially arranged partially reflecting surfaces, *a*, *b*, *c*, *d*, *e*, *f* and *g*, followed by a completely reflecting surface *h*. Preferably, between 30% and 50% of the light is reflected by the first partially reflecting surface *a*. The remainder passes through to the other mirrors, each of which in turn reflects a portion and passes a portion. Mirror *b* passes about 6/7 and reflects about 1/7. Mirror *c* passes about 5/6 and reflects about 1/6. Mirror *d* passes about 4/5 and reflects about 1/5. Mirror *e* passes about 3/4 and reflects about 1/4. Mirror *f* passes about 2/3 and reflects about 1/3. Mirror *g* reflects about half and passes about half. As stated above, mirror *h* reflects 100%. This results in a reference beam 4, and seven approximately equal beams 5 to 11, which will hereinafter be termed data beams.

By the Fresnel-Arago laws, if two beams which normally interfere are polarized, and if the direction of polarization of one is rotated with respect to the other by 90°, the beams will no longer interfere. This is the principle used to control the interfering beams. Each of the electro optical light modulators 12 to 18 rotates the direction of polarization of the light passing through it when it is energized. As mentioned above, any of several well known devices will accomplish this. In this way any or all of the interfering beams may be rendered noninterfering merely by energizing the proper light modulator.

Data beams 5 to 11 are controlled by electro optical light modulators 12 to 18 which are driven by driver amplifiers 25 to 32 which in turn are controlled from the data source 33. These devices can either rotate the polarization of the beams, as would be the case with a Pockels cell, a Kerr cell, or a Faraday cell, or they could block the beam completely, as by a shutter. The operation is explained below.

The beams then enter the radiation deflector 19 which comprises a multiple prism assembly. Each of the prisms refracts the beam coming into it at an angle of 90° so that it passes to the right. Because of the geometry of the prisms, the interfering beams will be equally spaced with respect to each other when emerging from the prisms, but will be separated from the comparison beam by a certain distance. The exit surfaces of the prism array are set at such angles that the light beams converge at area 21, with each of the information beams intersecting the reference beam at a uniquely different angle.

The beams coming from prism array 19 are imaged through cylindrical lens 20 to a focus at 21. Cylindrical lens 20 is used to narrow the spot of light coming from the prisms in one direction into a narrow line.

Because of the high degree of coherence of the light from a laser, the beams of light coming from the prisms and converging at area 21 will form an interference pattern. This is due to the difference in phase between each interfering beam and the comparison beam at different points in the area of intersection. According to principles of physical optics the spatial frequency of the interference pattern in cycles per mm. for each pair of interfering beams will be given by the equation.

$$f=\frac{\sin \theta}{\lambda}$$

where $\lambda$ is the wavelength of the light in mm., and $\theta$ is the angle between the comparison beam and the interfering beam. Of course, the individual interfering beams will form interference patterns between themselves, but because the angle between the individual interfering beams is small, the interference pattern frequency will be so low as not to be significant. Furthermore, the contrast of the pattern produced by two interfering beams would be lower than the contrast of a pattern produced by an interfering beam with the comparison beam because the comparison beam is brighter than any of the interfering beams.

As explained in the above-mentioned Lamberts and Higgins patent, it is desirable to keep all of the desired interfering pattern frequencies within an octave, so that the first order line of the highest frequency grating does not overlap the second order line of the lowest frequency grating during read-out. If a He-Ne gas laser operating at 6328 A. is used as the source, interfering spatial frequencies could be 70, 80, 90, 100, 110, 120 and 130 lines/mm. The interference pattern at 21 can be either magnified or reduced by the lens system consisting of lenses 22 and 23, or the lens system can be omitted entirely. If the lens system is used, a photosensitive film can be placed at 24. If the lens system is not used the photosensitive film is placed at 21. One advantage of using a lens system is that the image can be baffled from stray light at point 21.

Of course, any of the electro optical light modulators could be replaced by shutters, but since a shutter is a mechanical device, its speed of operation would be limited.

Because a laser beam can be concentrated to give an extremely intense image, this system enables even a relatively slow, fine grained film to be exposed in a time of the order of a micro-second. Coupled with this advantage, the electro optical devices can be operated at very high frequencies.

I claim:

1. The method of producing a composite diffraction grating comprising a plurality of line gratings of individually-distinct spatial frequencies effectively superimposed one upon another, said method comprising the steps of:

generating a beam of effectively coherent radiation, dividing said beam into a plurality of individual beams, directing said individual beams along respective ones of a plurality of unique paths intersecting one another in a common area so that pairs of said beams interfere to form respective line patterns of individually-distinct spatial frequencies at said area, selectively modulating at least one of said individual beams of each such pair to control the interference of that beam in said common area relative to the other beam of said pair, thereby selectively controlling the composition of said composite interference pattern, and positioning a radiation-sensitive recording medium relative to said area so that said composite interference pattern may be imaged thereon.

2. The method according to claim 1 wherein said modulating step comprises selectively altering the polarization of one said individual beam of each such pair relative to the other beam of said pair.

3. Apparatus for producing a composite difffraction grating pattern on a radiation-sensitive medium located at a predetermined position relative to said apparatus, said composite pattern comprising a plurality of line grating patterns of individually-distinct spatial frequencies effectively superimposed one upon another, said apparatus comprising:

a radiant energy source for generating a beam of effectively coherent radiation;

a beam splitter for dividing said beam into a plurality of individual beams;

a plurality of radiation deflectors for directing said individual beams along a plurality of unique paths intersecting one another in a common area so that pairs of said beams interfere to form respective line grating patterns of individually-distinct spatial frequencies at said predetermined recording position, and means for selectively modulating at least one of said individual beams of each such pair to control the interference of that beam at said position relative to the other beam of said pair, thereby selectively controlling the composition of said composite interference pattern.

4. The apparatus according to claim 3 wherein one of said individual beams is a reference beam and the other of said beams are data beams, said pairs of interfering beams each comprising said reference beam and a respective one of said data beams.

5. The apparatus according to claim 3 wherein said individual beams are directed along said unique intersecting paths so that the lowest spatial frequency of said respective grating patterns formed by the interference of said beam pairs is within an octave of the highest spatial frequency of said patterns.

6. The apparatus according to claim 3 wherein said modulating means selectively rotates the polarization of said individual beam relative to the other beam of said pair.

References Cited

UNITED STATES PATENTS

| | | | |
|---|---|---|---|
| 2,770,166 | 11/1956 | Gabor | 350—12 |
| 3,256,524 | 6/1966 | Stauffer | 346—76 |
| 3,312,955 | 4/1967 | Lamberts et al. | 340—173 |

RICHARD B. WILKINSON, *Primary Examiner.*

J. W. HARTARY, *Assistant Examiner.*